(12) United States Patent
Webster et al.

(10) Patent No.: US 11,366,826 B2
(45) Date of Patent: Jun. 21, 2022

(54) CUSTOMIZING DATA VISUALIZATIONS ACCORDING TO USER ACTIVITY

(71) Applicant: International Business Machines Corporation, Armonk, NY (US)

(72) Inventors: Stephen William Webster, Austin, TX (US); Spencer Thomas Reynolds, Austin, TX (US); Hanna Oh, Austin, TX (US); John Lynch, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/561,081

(22) Filed: Sep. 5, 2019

(65) Prior Publication Data

US 2021/0073242 A1 Mar. 11, 2021

(51) Int. Cl.
*G06F 16/26* (2019.01)
*G06F 7/08* (2006.01)

(52) U.S. Cl.
CPC ................ *G06F 16/26* (2019.01); *G06F 7/08* (2013.01)

(58) Field of Classification Search
None
See application file for complete search history.

(56) References Cited

U.S. PATENT DOCUMENTS

| | | | |
|---|---|---|---|
| 9,251,472 B1* | 2/2016 | Linowes | F24F 11/30 |
| 2003/0167278 A1 | 9/2003 | Baudel | |
| 2011/0179087 A1* | 7/2011 | Cypher | G06F 8/10 |
| | | | 707/802 |
| 2012/0144335 A1* | 6/2012 | Abeln | G06F 3/0482 |
| | | | 715/771 |
| 2014/0047312 A1* | 2/2014 | Ruble | G06F 16/9537 |
| | | | 715/212 |
| 2015/0019537 A1* | 1/2015 | Neels | G06F 16/26 |
| | | | 707/722 |
| 2015/0242446 A1 | 8/2015 | Stolte et al. | |
| 2018/0173733 A1* | 6/2018 | Nath | G06N 5/025 |
| 2019/0065014 A1* | 2/2019 | Richter | G06F 9/451 |
| 2019/0108272 A1 | 4/2019 | Talbot et al. | |

(Continued)

FOREIGN PATENT DOCUMENTS

| | | |
|---|---|---|
| CN | 104346435 A | 2/2015 |
| JP | 5947910 B2 | 7/2016 |
| WO | 2017079231 A1 | 5/2017 |

OTHER PUBLICATIONS

Google, "Display Spreadsheet Data in beautiful and functional views", Script Examples, printed Aug. 1, 2019, 7 pages <https://sites.google.com/site/scriptsexamples/available-web-apps/awesome-tables?utm_source=zapier. com&utm_medium=referral&utm_campaign=zapier>.

(Continued)

*Primary Examiner* — Kyle R Stork
(74) *Attorney, Agent, or Firm* — Peter J. Edwards (57) ABSTRACT

A method can include obtaining user interaction data by monitoring a set of user interactions between a user and one or more data elements of a data table. The method can further include determining a set of data element scores based, at least in part, on the user interaction data. The method can further include generating a customized data visualization based, at least in part, on the set of data element scores and the data elements of the data table.

11 Claims, 7 Drawing Sheets

(56) References Cited

U.S. PATENT DOCUMENTS

2019/0155802 A1    5/2019  Miller et al.
2020/0233898 A1*  7/2020  Barzelay ............ G06Q 30/0643
2021/0173863 A1*  6/2021  Collins .................. G06F 16/41

OTHER PUBLICATIONS

Mell et al., "The NIST Definition of Cloud Computing", Recommendations of the National Institute of Standards and Technology, Sep. 2011, 7 pages.

* cited by examiner

CUSTOMIZING DATA VISUALIZATIONS ACCORDING TO USER ACTIVITY

BACKGROUND

The present disclosure relates to data presentation, and more specifically, to data visualizations.

Data visualizations, such as interface cards, graphs, and charts, can be utilized to summarize and/or organize large quantities of data for review and/or analysis. Some data visualization tools include predetermined criteria for generating data visualizations.

SUMMARY

According to embodiments of the present disclosure, a method can include obtaining user interaction data. The user interaction data can be obtained by monitoring a set of user interactions between a user and one or more data elements of a data table. The method can further include determining a set of data element scores. The determining can be based, at least in part, on the user interaction data. The method can further include generating a customized data visualization. The customized data visualization can be based, at least in part, on the set of data element scores and the data elements of the data table.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data presentation; more particular aspects relate to customizing data visualizations according to user activity. While the present disclosure is not necessarily limited to such applications, various aspects of the disclosure can be appreciated through a discussion of various examples using this context.

Data tables, such as spreadsheets and databases, can include large quantities of data elements (e.g., fields, records, rows, columns, cells, etc.) where data is stored. To summarize and/or organize the data from such data tables (i.e., tabular data) for review and/or analysis, data visualizations, such as interface cards, graphs, and charts, can be generated. Tools for generating data visualizations from tabular data can be programmed based on assumptions of user preferences and can be cumbersome to tailor to a user's specific needs.

To address these and other problems, embodiments of the present disclosure include a custom visualization system that can monitor a set of user interactions between a user and one or more data elements of a data table; determine a set of data element scores that correspond to the set of user interactions; and generate a customized data visualization based, at least in part, on the set of data element scores. Thus, embodiments of the present disclosure can determine a degree of importance to a user of one or more data elements according to the user's interactions (e.g., manipulation) of the one or more data elements. Additionally, embodiments of the present disclosure can generate a customized data visualization that can reflect the determined degree of importance of the one or more data elements.

Figure 1:
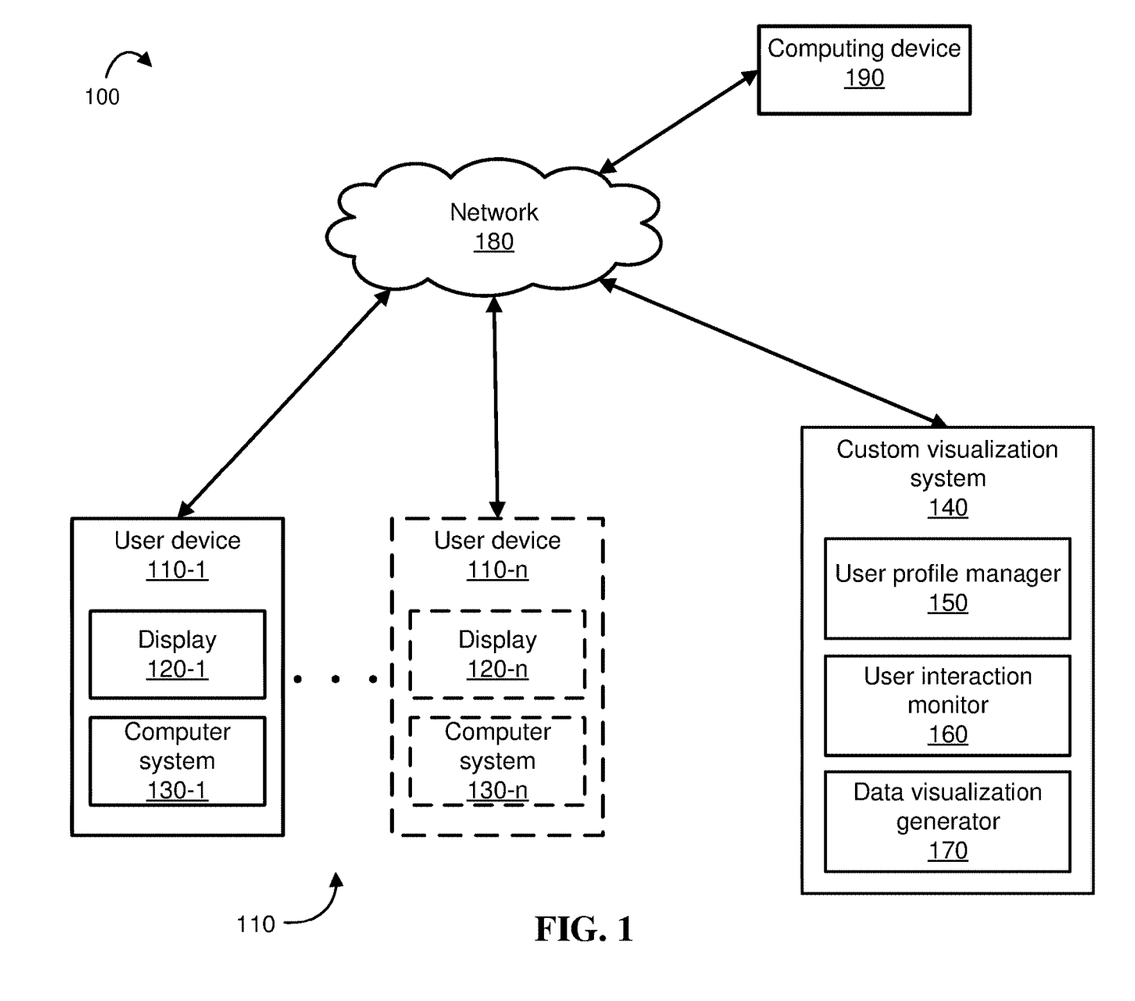
FIG. 1 depicts an example computing environment that includes a set of user devices, a computing device, a custom visualization system, and a network, in accordance with embodiments of the present disclosure.

Turning to the figures, FIG. 1 illustrates an example computing environment 100 that includes a set of user devices 110, a computing device 190, a custom visualization system 140, and a network 180, in accordance with embodiments of the present disclosure. The set of user devices 110 can include one or more user devices. For example, in some embodiments, the set of user devices 110 can include n devices, where n is an integer greater than zero. For example, n=1 in embodiments in which the set of user devices 110 includes only a first user device 110-1 having a first display 120-1 and a first computer system 130-1; n=2 in embodiments in which the set of user devices 110 includes two user devices (a first user device 110-1 having a first display 120-1 and a first computer system 130-1 and a second user device 110-2 having a second display 120-2 and a computer system 130-2); and so on. In some embodiments, the set of user devices 110 can include at least one electronic device such as a computer, tablet, or mobile telephone. In some embodiments, one or more of the set of user devices 110, the computing device 190, and the custom visualization system 140 can include a computer system such as the computer system 501 shown in FIG. 5. In some embodiments, the computing environment 100 can include a plurality of computing devices 190, custom visualization systems 140, and/or networks 180.

The first user device 110-1 includes a first display 120-1, such as an electronic visual display or a touch screen, and a first computer system 130-1. In some embodiments, the first display 120-1 can present a data table and/or a customized data visualization, to a user. In some embodiments, the first computer system 130-1 can include programming instructions to perform one or more method steps, such as those described in FIG. 2 below.

The set of user devices 110 can communicate with at least one of the computing device 190 and the custom visualization system 140 via one or more networks 180. In some embodiments, the custom visualization system 140 can be a computing device, such as a server, having a processor that implements one or more method steps, such as those described in FIG. 2 below. In some embodiments, the custom visualization system 140 can include a computer system, such as the computer system 501 shown in FIG. 5, that can implement one or more method steps, such as those described in FIG. 2 below.

In some embodiments, the custom visualization system 140 can include a discrete user profile manager 150, user interaction monitor 160, and data visualization generator 170. In some embodiments, the user profile manager 150, user interaction monitor 160, and/or data visualization generator 170 can be integrated into a single device, such as a processor of the custom visualization system 140. In some embodiments, one or more of the user profile manager 150, user interaction monitor 160, and/or data visualization generator 170 can be located remote from the custom visualization system 140.

In some embodiments, the user profile manager 150 can be configured to obtain, store, and update user data. In some embodiments, the user interaction monitor 160 can be configured to obtain and store user interaction data by monitoring a set of user interactions between a user and one or more data elements of a data table. In some embodiments, the user interaction monitor 160 can be configured to determine data element scores. In some embodiments, the data visualization generator 170 can be configured to generate customized data visualizations based, at least in part, on data element scores obtained from the user interaction monitor 160.

In some embodiments, the computing device 190 can be an electronic device such as a server or a computer. In some embodiments, the computing device 190 can be configured to store data tables, customized data visualizations, and/or user profiles that can be obtained by at least one of the set of user devices 110 and the custom visualization system 140.

Figure 2:
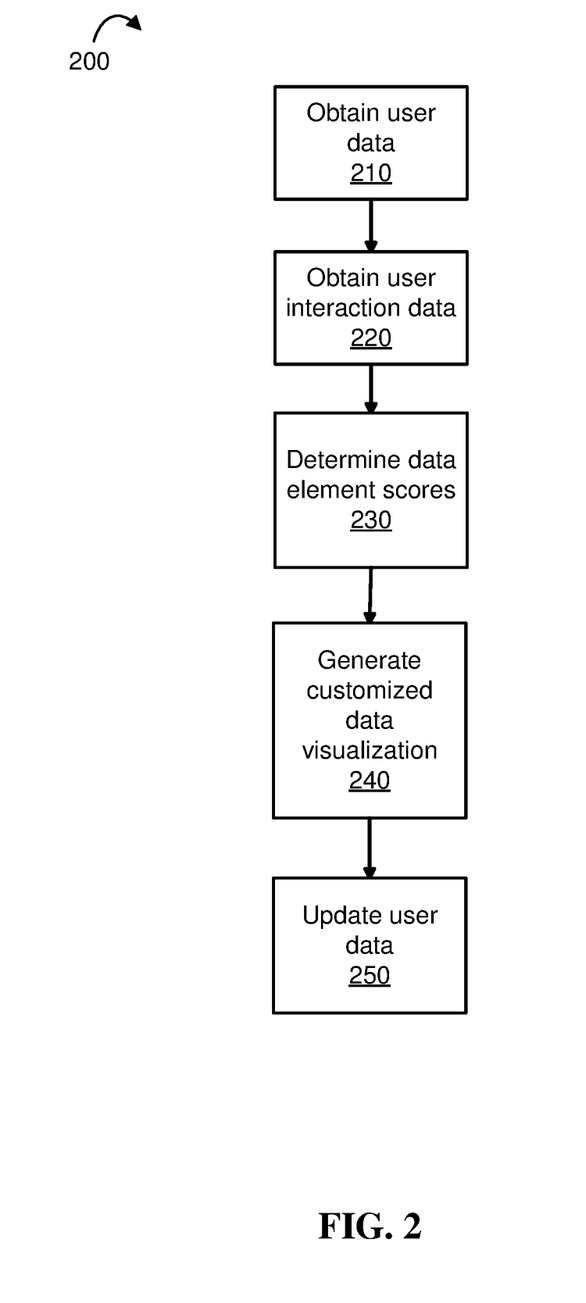
FIG. 2 depicts a flowchart of an example method for generating a data visualization, in accordance with embodiments of the present disclosure.

FIG. 2 illustrates a flowchart of an example method 200 for generating a data visualization, in accordance with embodiments of the present disclosure. The method 200 can be performed by a custom visualization system, such as the custom visualization system 140 described with respect to FIG. 1. Referring back to FIG. 2, in step 210, the custom visualization system can obtain user data. In some embodiments, user data can include information about a user, such as a user name, geographic location, job title, department of employment within a company or organization, etc. In some embodiments, user data can include one or more personas. In some embodiments, a persona can include a set of characteristics that represents a group of users. For example, in some embodiments, a first persona can be defined as a group of marketing department employees, a second persona can be defined as a group of sales department employees located in a New York office, and a third persona can be defined as a group of software programmers hired within the last 18 months. In some embodiments, user data can include data previously obtained, determined, and/or generated by the custom visualization system, such as user interaction data, data element scores, and/or customized data visualizations (each of which is discussed in further detail below). In some embodiments, such data previously obtained, determined, and/or generated by the custom visualization system can be utilized as a set of initial values by the custom visualization system.

In some embodiments, in step 210, the custom visualization system can obtain user data from a storage location, such as a memory of a user device or a server. In some embodiments, in step 210, the custom visualization system can obtain user data by manual user input (e.g., data transmitted by the user to the custom visualization system through a user interface, such as a keyboard or a touch screen, of a user device). In some embodiments, the custom visualization system can obtain user data by implementing data mining tools.

In some embodiments, in step 220, the custom visualization system can obtain user interaction data. In some embodiments, user interaction data can include electronic records of user interactions between a user and data elements (e.g., fields, records, rows, columns, cells, etc.) of a data table; thus, user interaction data can correspond to a set of user interactions between a user and one or more data elements of a data table. Such user interactions can include user manipulations of data elements of the data table. For example, in some embodiments, when a data element is a column, user interactions can include one or more of the following manipulations: rearranging (e.g., moving the column left or right within a data table); sorting (e.g., rearranging a set of cells within the column according to specified criteria, such as from least to greatest, in reverse alphabetical order, in chronological order, etc.); activating or deactivating visibility (e.g., showing the column within a data table or hiding the column within a data table without deleting the column); filtering (e.g., maintaining visibility of specified data within the column, while deactivating visibility of all other data within the column); and/or searching (e.g., identifying the location of specified data within the column). In some embodiments, a user interaction can include a manipulation such as reformatting a data element (e.g., changing a font, color, size, etc.) or selecting a hyperlink within a data element. In some embodiments, the custom visualization system can record a time that corresponds to each user interaction. For example, in some embodiments, if a user rearranges a first column, then sorts a second column, the custom visualization system can create a respective timestamp for each of the user interactions.

In some embodiments, in step 230, the custom visualization system can determine data element scores. In some embodiments, a data element score can include a numerical value that corresponds to a data element and can be modified according to user interactions between a user and the data element. For example, in some embodiments, a data element, such as a row of a data table, can have an initial data element score equal to 0. Continuing with this example, a user can activate visibility of the row, and in response, the custom visualization system can increase the data element score of the row by 1. As a result of the increase, the row can have a modified data element score equal to 1. Continuing with this example, a user can rearrange the row by moving it upward from a fifth position of the data table to a first position of the data table. In response, the custom visualization system can increase the data element score of the row by 4, resulting in a second modified data element score of the row being equal to 5.

In some embodiments, since a data element score can correspond to a set of user interactions between a user and a data element (e.g., a user's manipulations of the data element), the data element score can represent a degree of priority to the user of the data element. In some embodiments, the custom visualization system can include a set of rules that it can use to determine how a user interaction affects a data element score. For example, in some embodiments, a set of rules can specify that a first user interaction of filtering data in a first column of a data table can increase the data element score of the first column. Continuing with this example, the set of rules can further specify that a second user interaction of deactivating visibility of a second column of the data table can decrease the data element score of the second column. In this example, the set of rules can reflect an inference that the first column of the data table may have a higher degree of priority to the user than the second column of the data table. Such higher degree of priority can be inferred based on the user engaging the data in the first column, in contrast to the user hiding from view and not engaging the data in the second column.

In some embodiments, the custom visualization system can calculate a data element score (S) according to the formula:

$$S = \sum_{i=1}^{c} (Fi)(Ni) \quad (1), \text{ where:}$$

i=a count of a number of user interactions; c=a total number of user interactions; Fi=a weight assigned to the user interaction associated with the count; and Ni=a number of times the user performs the user interaction associated with the count. In some embodiments, a set of rules can specify the weight (Fi). For example, in some embodiments, a set of rules can specify a weight of (+1) for the user interaction of moving a column of a data table in a left direction within the data table. In this example, the set of rules can further specify a weight of (−1) for the user interaction of moving a column of the data table in a right direction within the data table. Thus, in this example, the set of rules can reflect an inference that a column moved in a left direction may have a higher degree of priority to the user than a column moved in a right direction. In some embodiments, the set of rules can be selected by an entity such as a user or a programmer of the custom visualization system, or by the custom visualization system itself (e.g., by a processor configured to select a set of rules based on user trends over time).

In some embodiments, frequent user interactions between a user and a data element can increase a data element score. For example, in some embodiments, during a period of one hour, a user can search a first column of a data table 20 times. Continuing with this example, the user can sort a second column of a data table 3 times. In this example, the user's more frequent activity with the first column can result in the first column having a higher data element score than the second column. Additionally, the user's more frequent activity with the first column can indicate a higher degree of priority to the user of the first column relative to the second column.

In some embodiments, the custom visualization system can include a time decay factor (e.g., $1/\Delta t$) when determining a data element score. In some embodiments, the time decay factor can reduce the effect of a user interaction on a data element score as time progresses. In these embodiments, more recent user interactions can have a greater effect on a data element score than older user interactions have on the data element score. For example, in some embodiments, when calculating a data element score using formula (1) and a time decay factor equal to $1/\Delta t$, a second user interaction that occurred two hours ago can have a weight (Fi) that is multiplied by ½; whereas, a first user interaction that occurred six hours ago can have a weight (Fi) that is multiplied by ⅙. Thus, in this example, the second, more recent user interaction can affect a data element score to a greater degree than the first, older user interaction.

In some embodiments, step 230 can include modifying an initial set of data element scores, resulting in a set of modified data element scores. For example, in some embodiments, the custom visualization system can include an initial set of data element scores that represents a default degree of priority to a user of a set of data elements. For example, in some embodiments, a first, leftmost column of a data table can have an initial data element score of 5; whereas, a second, adjacent column on the right side of the first column can have an initial data element score of 4. Continuing with this example, a user can perform multiple user interactions with the second column such that a modified data element score of the second column increases to 10. In this example, the respective data element scores of the first column and the second column can determine how data from the first column and data from the second column are displayed in a customized data visualization (this is discussed in further detail below).

In some embodiments, an initial set of data element scores can be obtained from stored user data, such as a set of data element scores previously determined for a specific user. For example, in some embodiments, an employee can regularly review spreadsheets that include similar types of data. In this example, a first set of data element scores determined by the custom visualization system based on the employee's user interactions with a first spreadsheet can be stored by the custom visualization system. Continuing with this example, the custom visualization system can utilize the first set of data element scores as an initial set of data element scores when the employee begins work on a second spreadsheet. In this way, the custom visualization system can transfer the employee's priority of data elements across spreadsheets and across data visualizations that can be generated from those spreadsheets.

In some embodiments, an initial set of data element scores can correspond to a set of data element scores previously determined for a group of users, such as a group of users having user profiles that match a particular persona. For example, in some embodiments, data element scores determined for each marketing department employee of a group of marketing department employees can be combined (e.g., averaged) to generate a set of data element scores for a marketing department employee persona. Continuing with this example, the set of data element scores for the marketing department employee persona can be stored so that it can be utilized by the custom visualization system as an initial set of data element scores when an employee having a profile that matches the persona begins work on a data table. In this way, the custom visualization system can transfer a group's aggregate priority of data elements across users having matching personas.

In some embodiments, in step 240, the custom visualization system can generate a customized data visualization. In some embodiments, a data visualization can include a graphic representation of tabular data (e.g., data from tables, spreadsheets, databases, etc.). For example, in some embodiments, a data visualization can include interface cards, graphs, and charts. In some embodiments, a customized data visualization can include a data visualization that is based, at least in part, on a set of user interactions. In some embodiments, a customized data visualization can include a data visualization that is based, at least in part, on a set of data element scores.

In some embodiments, the custom visualization system can generate a customized data visualization according to data visualization settings. In some embodiments, data visualization settings can determine data visualization characteristics such as an appearance of data element data (e.g., a size, color, font, orientation, etc., of data element data); a location of data element data; and a quantity of data element data (e.g., whether a data visualization includes data from three columns or from five columns) in the customized data visualization. In some embodiments, one or more data visualization characteristics can correspond to one or more data element scores. For example, in some embodiments, data visualization settings can designate that data from a data element (e.g., data from a first column) having the highest relative data element score among a set of data element scores can be displayed in 20-pt font, whereas data from a data element having a second highest relative data element score can be displayed in a 12-pt font. In some embodiments, the data visualization settings can be selected by an entity such as a user or a programmer of the custom visualization system, or by the custom visualization system itself (e.g., by a processor configured to select data visualization settings based on user trends over time).

In some embodiments, in step 250, the custom visualization system can update user data. For example, in some embodiments, step 250 can include the custom visualization system storing one or more of user interaction data, modified data element scores, and customized data visualizations, to a user profile. In some embodiments, step 250 can include the custom visualization system storing one or more of user interaction data, modified data element scores, and customized data visualizations, to a profile corresponding to a group of users, such as a group of users sharing a persona.

Figure 3:
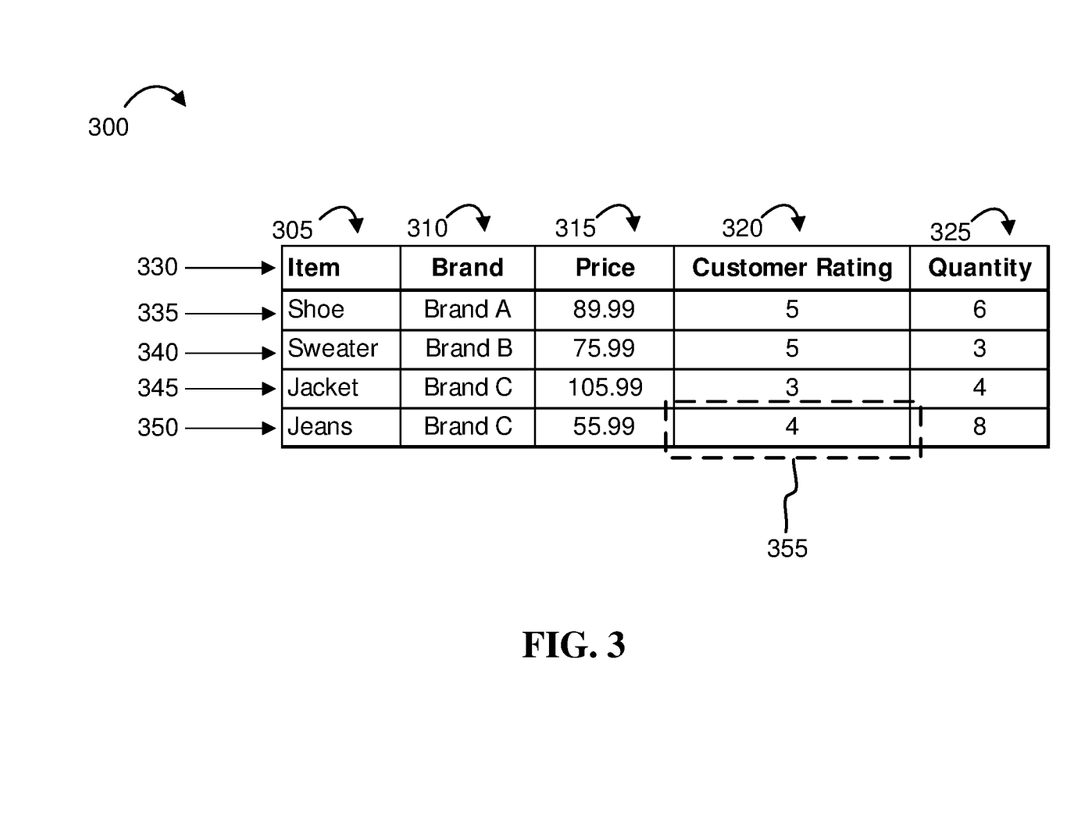
FIG. 3 depicts an example data table that can be used to generate a customized data visualization, in accordance with embodiments of the present disclosure.

FIG. 3 depicts an example data table 300 that can be used to generate a data visualization, in accordance with embodiments of the present disclosure. In some embodiments, data table 300 can be a spreadsheet or a database displayed on a user device, such as user device 110-1 shown in FIG. 1. Data table 300 includes an item column 305, a brand column 310, a price column 315, a customer rating column 320, and a quantity column 325. Data table 300 also includes a row of column headings 330, a first row 335 corresponding to a first item, a second row 340 corresponding to a second item, a third row 345 corresponding to a third item, and a fourth row 350 corresponding to a fourth item. Data table 300 also includes a set of cells, such as cell 355. In some embodiments, each of the rows, columns, and cells can be a distinct data element, each including data element data (i.e., data stored in a data element). For example, cell 355 includes the data element data "4." In another example, item column 305 includes the data element data "shoe," "sweater," "jacket," "jeans."

In some embodiments, a user can electronically perform a variety of user interactions with the data table 300. For example, in some embodiments, a user can rearrange the brand column 310 by moving it to the right side of the quantity column 325. In some embodiments, a user can sort the customer rating column 320 from a lowest to a highest customer rating value such that each of the rows 335, 340, 345, and 350 is arranged according to an ascending customer rating value. In some embodiments, a user can deactivate visibility of the brand column 310 such that it does not appear in the data table 300. In some embodiments, a user can filter the brand column 310 such that only the third row 345 and the fourth row 350, corresponding to "Brand C" are visible in the data table 300. In some embodiments, a user can search the item column 305 to identify cells in the item column that include the term "shoe."

Figure 4A:
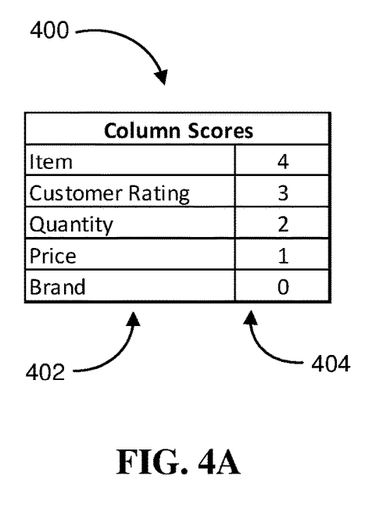
FIG. 4A depicts an example table of data element scores generated by a custom visualization system, in accordance with embodiments of the present disclosure.

FIG. 4A depicts an example table 400 of data element scores 404 generated by a custom visualization system, in accordance with embodiments of the present disclosure. Column headings 402 correspond to the column headings 330 of FIG. 3. Data element scores 404 correspond to the respective columns of data table 300 having the column headings 402. For example, table 400 shows that the item column 305 of FIG. 3 has a data element score of 4; the customer rating column 320 of FIG. 3 has a data element score of 3; etc. Additionally, data element scores 404 correspond to user interactions between a user and the respective columns. For example, in some embodiments, the item column 305 of FIG. 3 may have received 4 user interactions from a user, resulting in the data element score of 4, while the brand column 310 of FIG. 3 may have received 0 user interactions from the user, resulting in the data element score of 0.

Figure 4B:
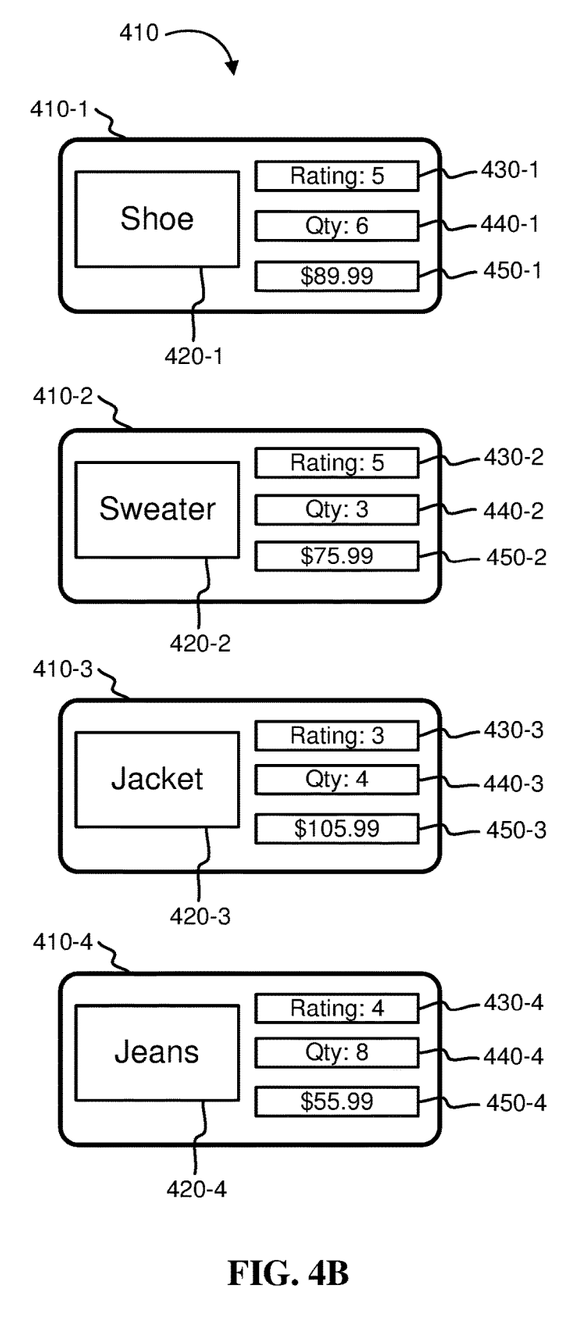
FIG. 4B depicts an example set of customized card visualizations that can be generated by a custom visualization system using the example data table of FIG. 3 and the example set of data element scores of FIG. 4A, in accordance with embodiments of the present disclosure.

FIG. 4B depicts an example set of customized card visualizations 410 that can be generated by a custom visualization system using the data table 300 of FIG. 3 and the table 400 of data element scores 404 of FIG. 4A, in accordance with embodiments of the present disclosure. The set of customized card visualizations 410 includes a customized card visualization 410-1 that displays data from the first row of data table 300; a customized card visualization 410-2 that displays data from the second row of data table 300; a customized card visualization 410-3 that displays data from the third row of data table 300; and a customized card visualization 410-4 that displays data from the fourth row of data table 300. Additionally, each of the customized card visualizations 410 displays data from four columns of data table 300. For example, boxes 420-1, 420-2, 420-3, and 420-4 display, respectively, data from the item column 305 of FIG. 3. Boxes 430-1, 430-2, 430-3, and 430-4 display, respectively, data from the customer rating column 320 of FIG. 3. Boxes 440-1, 440-2, 440-3, and 440-4 display, respectively, data from the quantity column 325 of FIG. 3. Boxes 450-1, 450-2, 450-3, and 450-4 display, respectively, data from the price column 315 of FIG. 3.

The customized card visualizations 410 were generated by a custom visualization system according to data visualization settings. In this example, the data visualization settings determined the data visualization characteristics shown in FIG. 4B (e.g., the use of card visualizations to display the data, the display of four rows of the data, the size and font of the displayed data, etc.). Additionally, in this example, the data visualization settings determined the correspondence between the data visualization characteristics shown in FIG. 4B and the set of data element scores 404 shown in FIG. 4A. For example, table 400 shows that the item column (305 in FIG. 3) has the highest data element score (i.e., 4) among the set of five data element scores shown. Accordingly, for each of the customized card visualizations 410, the data from the item column (305 in FIG. 3) is displayed in boxes 420-1, 420-2, 420-3, and 420-4. In this example, the custom visualization system displays the data from the item column more prominently (e.g., boxes 420-1, 420-2, 420-3, and 420-4 have a larger size and include larger text) than other data in the customized card visualizations 410, based on the item column having the highest data element score. Since the item column has the highest data element score, it may have the highest degree of priority to the user; thus, its more prominent display can help the user to quickly locate and interpret the corresponding data.

Further in this example, table 400 shows that the customer rating column (320 in FIG. 3) has the second highest data element score (i.e., 3). Accordingly, for each of the customized card visualizations 410, the data from the customer rating column (320 in FIG. 3) is displayed in a top position in the customized card visualizations (e.g., box 430-1 is displayed above boxes 440-1 and 450-1). Further in this example, table 400 shows that the quantity column (325 in FIG. 3) has the third highest data element score (i.e., 2). Accordingly, for each of the customized card visualizations 410, the data from the quantity column (325 in FIG. 3) is displayed in a middle position in the customized card visualizations (e.g., box 440-1 is displayed between boxes 430-1 and 450-1). Further in this example, table 400 shows that the price column (315 in FIG. 3) has the fourth highest data element score (i.e., 1). Accordingly, for each of the customized card visualizations 410, the data from the price column (315 in FIG. 3) is displayed in a bottom position in the customized card visualizations (e.g., box 450-1 is displayed below boxes 430-1 and 440-1). Additionally, according to the data visualization settings, only the data from the columns having the four highest data element scores (i.e., item column 305, customer rating column, 320, quantity column 325, and price column 315) were displayed in the customized card visualizations 410 by the custom visualization system. Thus, no data from the brand column (310 in FIG. 3) is displayed in the customized card visualizations 410.

By correlating data visualization characteristics with data element scores, embodiments of the present disclosure can generate customized data visualizations that automatically arrange tabular data in a way that reflects an order of priority of the data to the user. Thus, the customized data visualizations generated according to embodiments of the present disclosure can tailor a display of tabular data to correspond to a user's interests. Such a tailored display can improve a user's ability to efficiently locate, review, and/or analyze tabular data.

Figure 5:
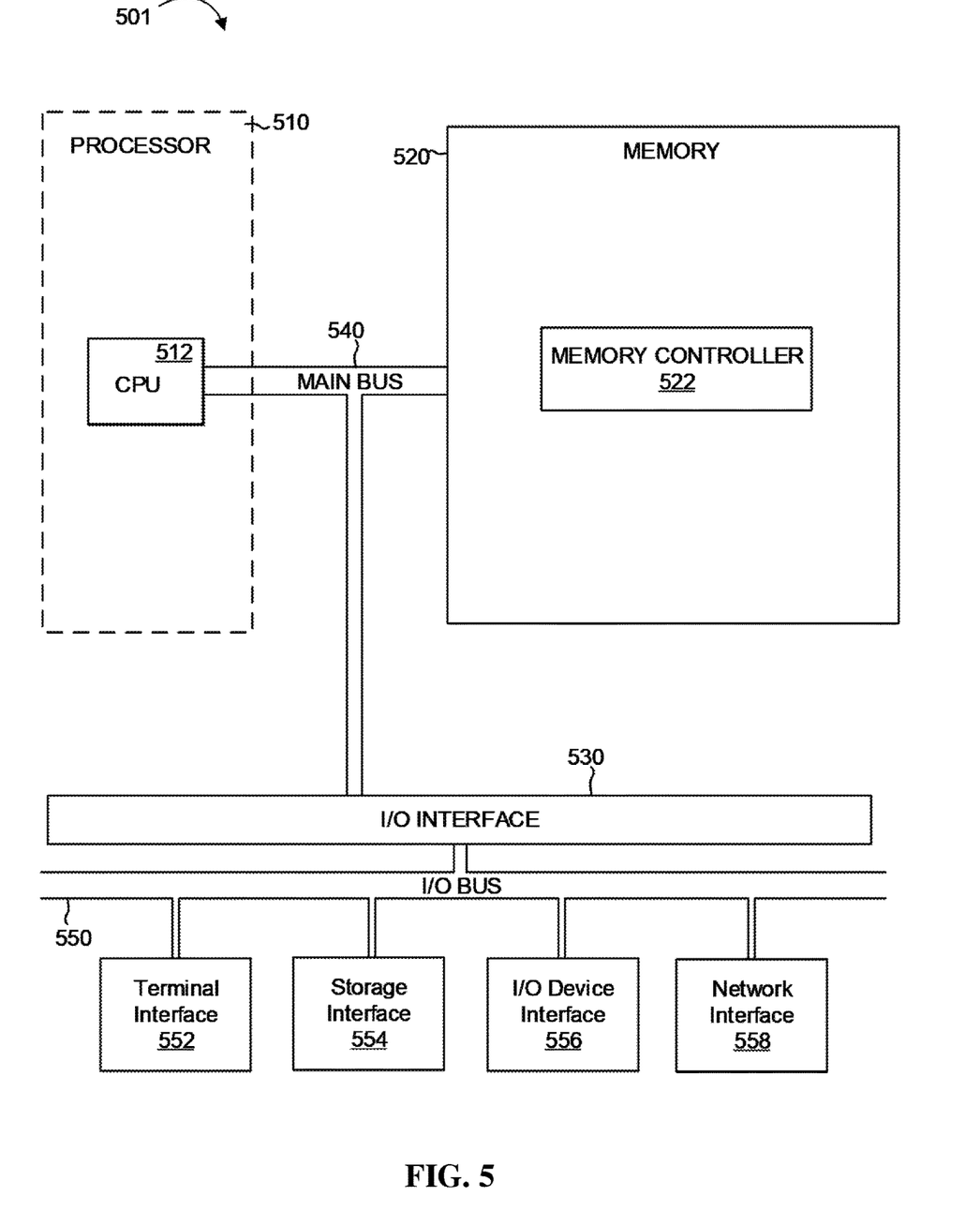
FIG. 5 depicts the representative major components of a computer system that can be used in accordance with embodiments of the present disclosure.

FIG. 5 depicts the representative major components of an exemplary Computer System 501 that can be used in accordance with embodiments of the present disclosure. The particular components depicted are presented for the purpose of example only and are not necessarily the only such variations. The Computer System 501 can comprise a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or more methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or non-volatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
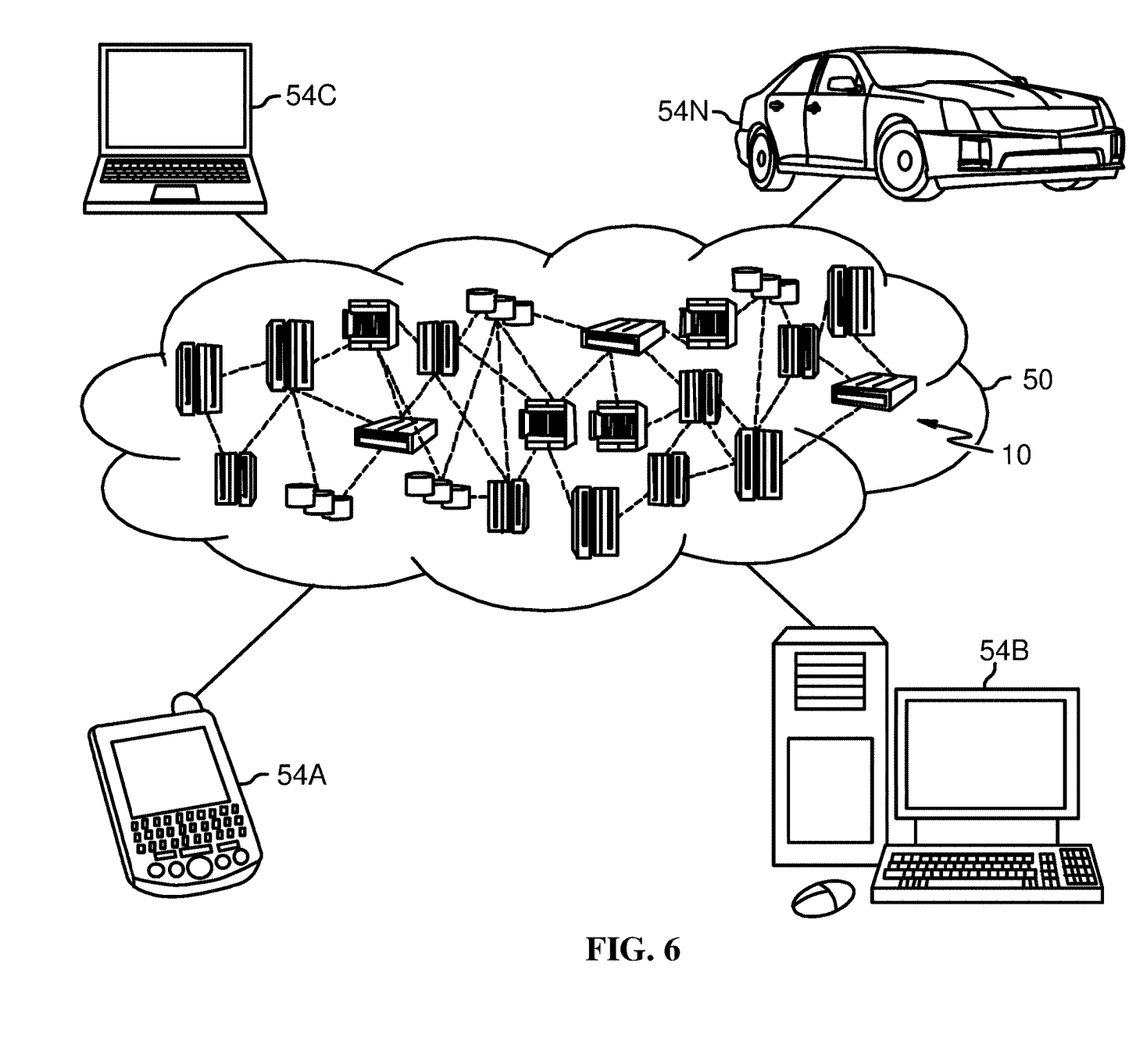
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
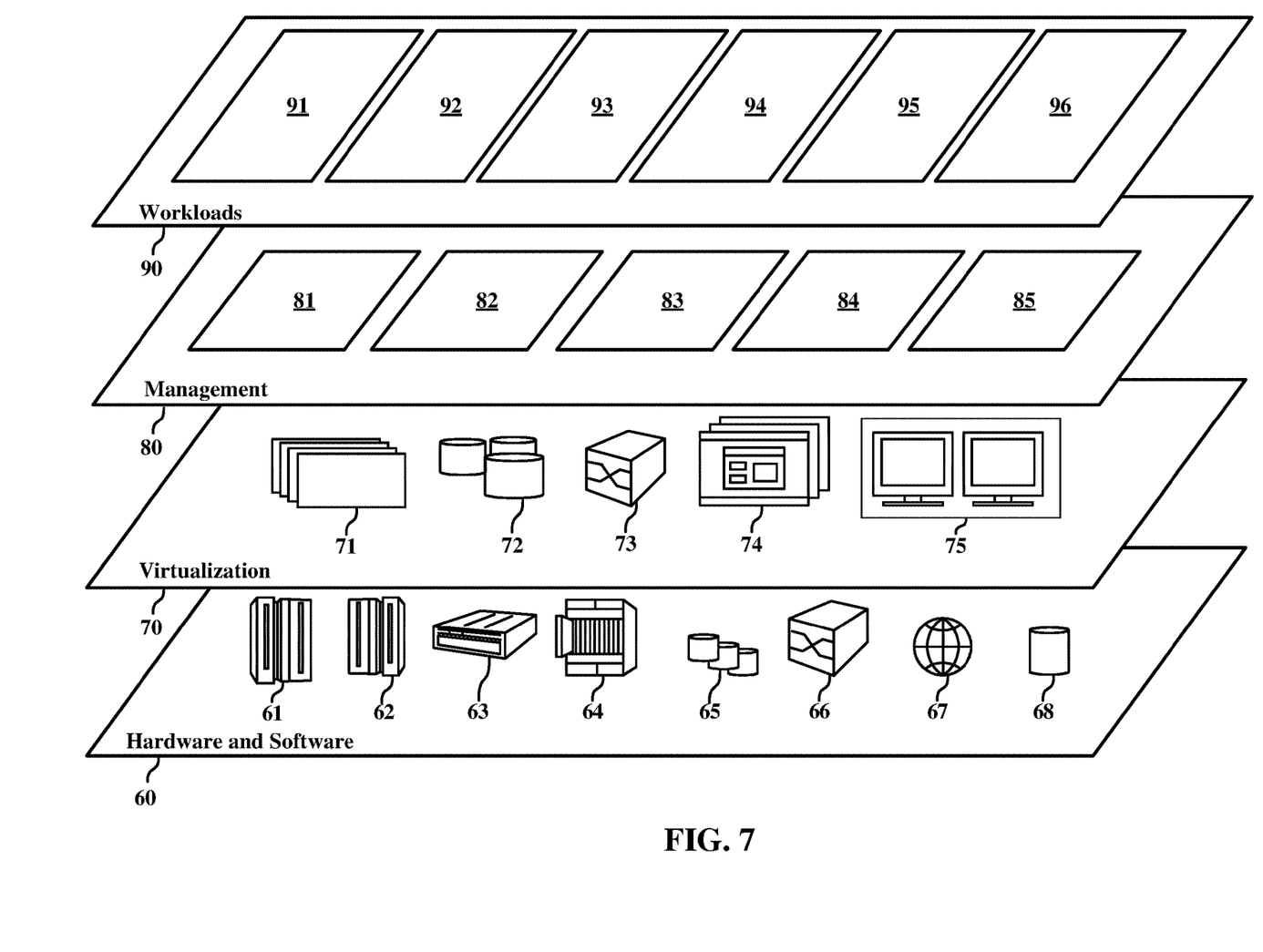
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and data visualization logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring a set of manipulations by a user of one or more data elements of a preexisting data table, the set of manipulations including at least one manipulation selected from the group consisting of:
      sorting the one or more data elements,
      filtering the one or more data elements, and
      searching the one or more data elements;
   the one or more data elements selected from the group consisting of one or more fields, records, rows, columns, and cells, of the preexisting data table;
   determining a set of data element scores based, at least in part, on the set of manipulations, the set of data element scores indicating a degree of priority to the user of the one or more data elements,
   wherein determining the set of data element scores comprises:
      implementing a set of rules that specifies increasing a first data element score of the set of data element scores based on a first set of manipulations by the user of the one or more data elements and decreasing the first data element score based on a second set of manipulations by the user of the one or more data elements,
      assigning a weight to a first manipulation of the set of manipulations, and
      utilizing a time decay factor; and
   generating a customized data visualization based, at least in part, on the set of data element scores and the one or more data elements.

2. The computer-implemented method of claim 1, wherein determining the set of data element scores further comprises calculating a product of:
   the weight, and
   a number of times the user performs the first manipulation.

3. The computer-implemented method of claim 2, wherein the product further comprises the time decay factor.

4. The computer-implemented method of claim 1, wherein determining the set of data element scores comprises modifying an initial set of data element scores.

5. The computer-implemented method of claim 4, wherein the initial set of data element scores corresponds to a group of users having user profiles that match a persona, and wherein the initial set of element scores indicates an aggregate degree of priority to the group of users of the one or more data elements.

6. A system comprising:
   a processor; and
   a memory in communication with the processor, the memory containing program instructions that, when executed by the processor, are configured to cause the processor to perform a method, the method comprising:
   monitoring a set of user interactions between a user and one or more data elements of a data table, the set of user interactions comprising manipulations by the user of the one or more data elements, the one or more data elements selected from the group consisting of one or more fields, records, rows, columns, and cells of the data table,
   wherein the set of user interactions includes at least one user interaction selected from the group consisting of: moving a data element and changing a visibility of a data element;
   determining a set of data element scores based, at least in part on the set of user interactions, the set of data element scores indicating a degree of priority to the user of the one or more data elements,
   wherein determining the set of data element scores comprises:
      implementing a set of rules that specifies increasing a first data element score of the set of data elements cores based on a first set of user interactions and decreasing the first data element score based on a second set of user interactions, assigning a weight to a first interaction of the set of interactions, and utilizing a time decay factor; and generating a customized data visualization based at least in part, on the set of data element scores and the one or more data elements of the data table.

7. The system of claim 6, wherein determining the set of data element scores comprises calculating a product of:

a number of times the user performs a first user interaction of the set of user interactions, and a weight assigned to the first user interaction.

8. The system of claim 7, wherein the product further comprises a time decay factor.

9. The system of claim 6, wherein determining the set of data element scores comprises modifying an initial set of data element scores.

10. The system of claim 9, wherein the initial set of data element scores corresponds to a group of users having user profiles that match a persona, and wherein the initial set of element scores indicates an aggregate degree of priority to the group of users of the one or more data elements.

11. A computer program product comprising a computer readable storage medium having program instructions embodied therewith, wherein the computer readable storage medium is not a transitory signal per se, the program instructions executable by a processor to cause the processor to perform a method, the method comprising:

monitoring a set of user interactions between a user and one or more data elements of a data table, the one or more data elements selected from the group consisting of one or more fields, records, rows, columns, and cells of the data table, the set of user interactions comprising manipulations by the user of the one or more data elements, wherein the manipulations are selected from the group consisting of: sorting, filtering, searching, moving, and changing a visibility;

determining a set of data element scores based, at least in part, on the set of user interactions, the set of data element scores indicating a degree of priority to the user of the one or more data elements, wherein determining the set of data element scores comprises:

implementing a set of rules that specifies increasing a first data element score of the set of data element scores based on a first set of user interactions and decreasing the first data element score based on a second set of user interactions, calculating a product of a number of times the user performs a first user interaction of the set of user interactions and a weight assigned to the first user interaction, and modifying an initial set of data element scores; and generating a customized data visualization based, at least in part, on the set of data element scores and the one or more data elements of the data table.

\* \* \* \* \*